(12) United States Patent
Safai et al.

(10) Patent No.: US 8,777,163 B2
(45) Date of Patent: Jul. 15, 2014

(54) ICE PROTECTION SYSTEM AND METHOD

(75) Inventors: Morteza Safai, Seattle, WA (US);
Rangasamy Elangovan, Bothell, WA (US); Vyacheslav Khozikov, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1256 days.

(21) Appl. No.: 12/553,481

(22) Filed: Sep. 3, 2009

(65) Prior Publication Data

US 2011/0049300 A1    Mar. 3, 2011

(51) Int. Cl.
*B64D 15/12*    (2006.01)

(52) U.S. Cl.
USPC ...................................... 244/134 D

(58) Field of Classification Search
USPC .................. 244/134 D, 134 R; 60/39.039
See application file for complete search history.

(56) References Cited

U.S. PATENT DOCUMENTS

| | | | |
|---|---|---|---|
| 2,142,785 A * | 1/1939 | Hanson | 244/134 D |
| 4,895,322 A | 1/1990 | Zieve | |
| 5,553,815 A | 9/1996 | Adams et al. | |
| 6,371,411 B1 | 4/2002 | Breer et al. | |
| 6,448,558 B1 | 9/2002 | Greene | |
| 6,457,676 B1 | 10/2002 | Breer et al. | |
| 2007/0102582 A1* | 5/2007 | Botura et al. | 244/134 D |
| 2008/0251642 A1* | 10/2008 | Boschet et al. | 244/134 D |
| 2008/0304539 A1 | 12/2008 | Safai et al. | |
| 2009/0129431 A1 | 5/2009 | Safai et al. | |

FOREIGN PATENT DOCUMENTS

| | | |
|---|---|---|
| EP | 0 433 763 A2 | 6/1991 |
| GB | 1012165 A | 12/1965 |
| GB | 2 251 417 A | 7/1992 |

OTHER PUBLICATIONS

Elangovan, R. et al., *Analysis of Layered Composite Skin Electro-Thermal Anti-Icing System*, 46th AIAA Aerospace Sciences Meeting and Exhibit, Jan. 7-10, 2008, Reno, NV, AIAA-2008-0446, pp. 1-15.
Elangovan, R. et al., *Modeling of Acoustically Treated Nacelle Lip Transpiration Flow Anti-Icing System*, 26th International Congress of the Aeronautical Sciences, 2008, pp. 1-13.
McCullough, R. W., *Transient Thermographic Technique for NDI of Aerospace Composite Structures*, Proc. of SPIE, vol. 5405, (2004), pp. 390-402.
Safai, M. et al., *Thermographic Non-Destructive Testing Using Inductive Thermal Excitation*, The Boeing Company, Seattle, WA, (undated), 9 pages.
Wang, K. F. et al., *Finite-Element Simulation of Induction Heat Treatment*, Journal of Materials Engineering and Performance, vol. 1(1), Feb. 1992, pp. 97-112.
European Search Report for Application No. 10175287.1; dated Mar. 19, 2013.

* cited by examiner

*Primary Examiner* — Tien Dinh
*Assistant Examiner* — Richard R Green
(74) *Attorney, Agent, or Firm* — Alston & Bird LLP

(57) ABSTRACT

An ice protection system and method are provided that facilitate the prevention or reduction in ice formation upon an aerodynamic surface. The ice protection system may include at least one induction coil spaced apart from an electrically conductive layer of an aerodynamic surface and disposed interior of an exterior surface of the aerodynamic surface. For example, the ice protection system may include a plurality of induction coils with each induction coil being spaced apart from the other induction coils such that the respective induction coils are associated with different portions of the aerodynamic surface. The ice protection system may also include a signal source configured to provide alternating current to the induction coil(s) to thereby generate an electromagnetic field that creates an eddy current in the electrically conductive layer so as to heat the electrically conductive layer.

20 Claims, 4 Drawing Sheets

ICE PROTECTION SYSTEM AND METHOD

TECHNOLOGICAL FIELD

Embodiments of the present disclosure relate generally to ice protection systems and methods and, more particularly, to systems and methods for preventing or reducing the icing of an aerodynamic surface.

BACKGROUND

Aircraft may be subject to the formation of ice, such as upon the various leading edges, when exposed to icing conditions. Similarly, other aerodynamic surfaces, such as the blades of a wind turbine, may be subject to the formation of ice when exposed to icing conditions. Ice formation upon a leading edge of an aircraft or other aerodynamic surface may have an adverse effect upon the performance of the aircraft, wind turbine or the like. As such, various ice protection systems have been developed to prevent or reduce the formation of ice, at least upon selected aerodynamic surfaces. In this regard, ice protection systems may heat a leading edge or other aerodynamic surface to a temperature above that suitable for ice formation in order to prevent or reduce ice formation.

With respect to aerodynamic surfaces formed of one or more thermally conductive layers of material, heating elements may be disposed within the aerodynamic surface with the heat generated by the heating elements propagating through the thermally conductive layers so as to heat the leading edge or other aerodynamic surface. Such heating techniques may be insufficient, however, for aerodynamic surfaces that are not formed of thermally conductive materials. By way of example, the inlet lip surface of an engine nacelle may include an acoustic liner for attenuating inlet noise. In this regard, the inlet lip surface of an engine nacelle may be lined with an acoustic liner having a honeycomb core sandwiched between a perforated composite face sheet and a solid composite back sheet. An inlet lip surface of an engine nacelle may also include a porous metallic erosion barrier that overlies the porous composite face sheet in order to protect the acoustic liner.

Although the acoustic liner may prove effective for attenuating inlet noise, the acoustic liner and, in particular, the honeycomb core and the air contained within the cells of the honeycomb core may effectively thermally insulate the exterior surface, that is, the porous metallic erosion barrier, upon which ice may form from heat that may be generated by heating elements positioned within the inlet lip surface, such as heating elements positioned interior of the composite back sheet. As such, conventional heating methods may prove less effective than desired with respect to protecting an inlet lip surface having an acoustic panel from ice formation.

Another technique for restricting ice formation relies upon bleed air that has been heated and is recirculated to the inlet lip surface of the engine nacelle in order to heat the inlet lip surface. As will be apparent, ice protection systems that rely upon bleed air are not effective for electric aircraft or other systems that do not have bleed air available. Moreover, the generally static air within the cells of the honeycomb core of an acoustic liner may also insulate the exterior surface from the bleed air, thereby reducing the heat transfer rate to the exterior surface and/or increasing the amount of bleed air required to protect the exterior surface from ice formation.

Ice protection systems are being developed for aerodynamic surfaces that include acoustic liners. For example, a low-power electrical de-icing system utilizes embedded wire mesh heating elements disposed within a composite layer positioned near the exterior erosion barrier. The wire mesh heating elements of a low-power electrical de-icing system may disadvantageously increase the weight of the aerodynamic surface and may consume a meaningful amount of power in order to support current flow through the entire wire mesh network. As a result of the power consumption, the power supply of the low-power electrical de-icing system may need to be sized in such manner that it also disadvantageously increases the weight and the cost of the aerodynamic surface. As another example, a transpiration flow anti-icing system is also being developed for titanium lip inlets having acoustic liners. A transpiration flow anti-icing system requires engine bleed air and is therefore inapplicable with respect to an electric aircraft or other system in which bleed air is unavailable. Also, since the upper temperature limit of the composite materials that are employed in acoustic liners is about 220° F. and since the bleed air temperatures are substantially higher, such as between about 800° F. and 1100° F., a transpiration flow anti-icing system may not be suitable for anti-icing an acoustically treated aerodynamic surface that employs composite materials.

As such, it would be desirable to provide an improved ice protection system and method. In particular, it would be desirable to provide an improved ice protection system and method from aerodynamic surface that includes an acoustic liner or other structure that limits the thermal conductivity of the aerodynamic surface.

SUMMARY

An ice protection system and method are provided according to embodiments of the present disclosure that facilitate the prevention or reduction in ice formation upon an aerodynamic surface. In one embodiment, the ice protection system utilizes induction coils to generate an electromagnetic field that creates eddy currents in the aerodynamic, electrically conductive surface so as to heat the aerodynamic surface. By relying upon the generation of electromagnetic fields, the induction coils may be separated from the aerodynamic surface by one or more layers that are relatively thermally insulated, while still effectively heating the aerodynamic surface. Moreover, the use of induction heaters by an ice protection system and method of one embodiment may permit the aerodynamic surface to be efficiently heated in terms of power consumption and/or to be heated in a manner that does not substantially increase the weight of the aerodynamic surface.

An ice protection system of one embodiment includes an aerodynamic surface having an electrically conductive layer proximate an exterior surface. The ice protection system of this embodiment also includes at least one induction coil spaced apart from the electrically conductive layer and disposed interior of the exterior surface. For example, the ice protection system may include a plurality of induction coils with each induction coil being spaced apart from the other induction coils such that the respective induction coils are associated with different portions of the aerodynamic surface. The ice protection system of this embodiment also includes a signal source configured to provide alternating current to the induction coil to thereby generate an electromagnetic field that creates an eddy current in the electrically conductive layer so as to heat the electrically conductive layer. The ice protection system of one embodiment may also include a temperature sensor configured to monitor the temperature of the electrically conductive layer and a controller configured to control the alternating current that is provided by the signal source to the induction coil based upon the temperature of the electrically conductive layer as monitored by the temperature sensor.

The aerodynamic surface may include at least one additional layer between the induction coil and the electrically conductive layer. In this embodiment, the additional layer is formed of a less conductive material than the electrically conductive layer. For example, the less conductive material of the at least one additional layer may be less conductive, both thermally and electrically, than the electrically conductive layer. The aerodynamic surface of one embodiment includes an engine nacelle inlet having a metallic erosion barrier as the electrically conductive layer and further including a composite face sheet, a honeycomb core and a composite back sheet. Alternatively, the aerodynamic surface may be the leading edge flap, the leading edge of a wing or the leading edge of wind turbine blade.

The ice protection system of another embodiment includes a plurality of induction coils spaced apart from an aerodynamic surface that is to be heated. In this embodiment, a respective induction coil is also spaced from the other induction coils such that the respective induction coils are associated with different portions of the aerodynamic surface. The ice protection system of this embodiment also includes a signal source configured to provide alternating current to the plurality of induction coils such that the induction coils responsively generate an electromagnetic field that creates an eddy current in the aerodynamic surface so as to heat the aerodynamic surface. The ice protection system may also include a temperature sensor configured to monitor the temperature of the aerodynamic surface and a controller configured to control the provision of the alternating current by the signal source to the plurality of induction coils based upon the temperature of the aerodynamic surface as monitored by the temperature sensor.

The signal source of one embodiment may be configured to provide alternating radio frequency current to the plurality of induction coils. In one embodiment, the signal source may be configured to concurrently provide alternating current to each induction coil. In another embodiment, the signal source may be configured to provide alternating current to respective induction coils during different time periods. Further, the signal source may be configured to provide alternating current having a frequency that is based upon the spacing between the induction coils and the aerodynamic surface and properties of materials that may be imposed between the coils and the aerodynamic surface.

In yet another embodiment, an ice protection method is provided that includes providing a plurality of induction coils spaced apart from an aerodynamic surface to be heated. A respective induction coil is also spaced apart from other induction coils such that respective induction coils are associated with different portions of the aerodynamic surface. The method of this embodiment also provides alternating current to the induction coils and generates an electromagnetic field in response to the alternating current that creates an eddy current in the aerodynamic surface so as to heat the aerodynamic surface. In one embodiment, the method may also monitor the temperature of the aerodynamic surface and control the provision of the alternating current to the plurality of induction coils based upon the temperature of the aerodynamic surface as monitored.

The provision of alternating current in accordance with one embodiment may include the provision of alternating current to the plurality of induction coils. In one embodiment, the method may concurrently provide alternating current to each induction coil. In another embodiment, the method may provide alternating current to respective induction coils during different time periods. The method of one embodiment may provide alternating current having a frequency that is based upon the spacing between the induction coils and the aerodynamic surface.

The features, functions and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

Figure 1:
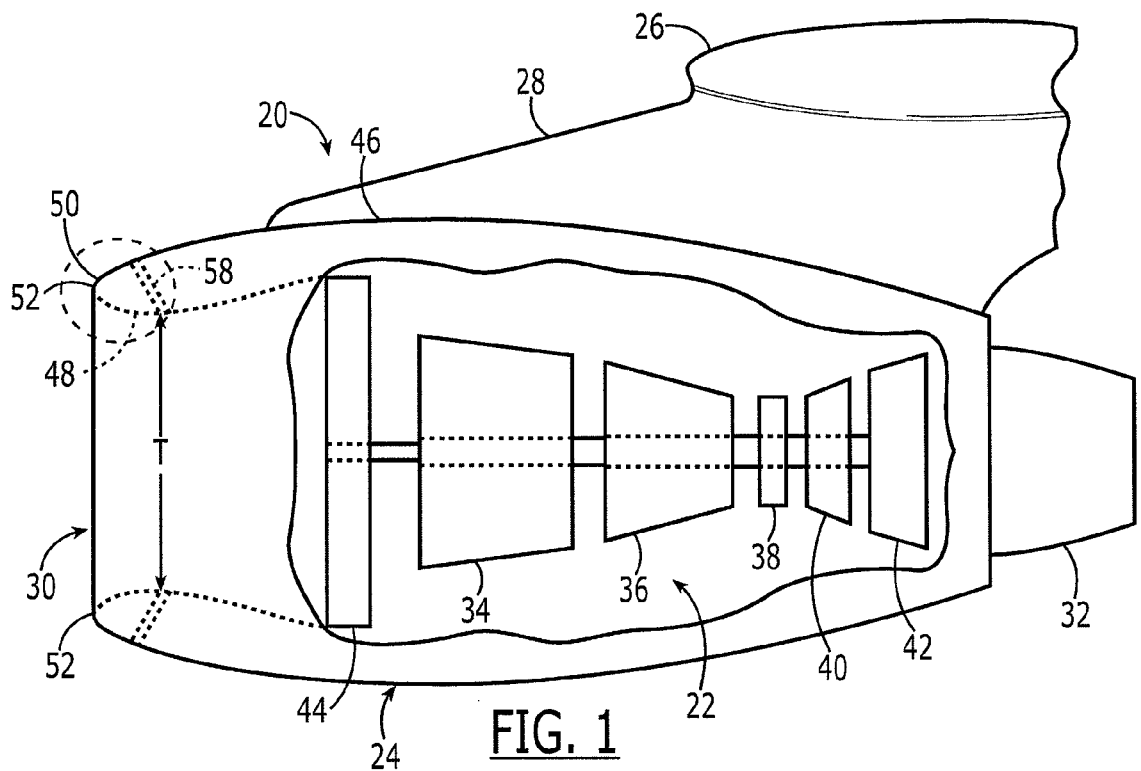
Figure 2:
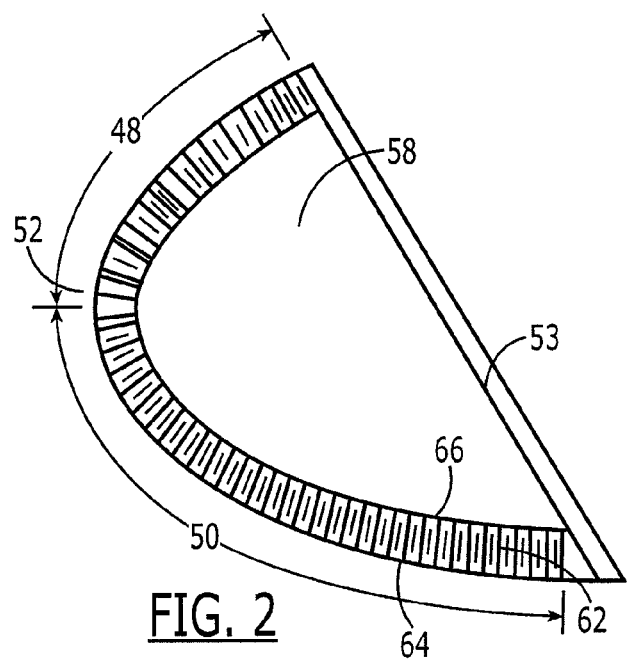
Figure 3:
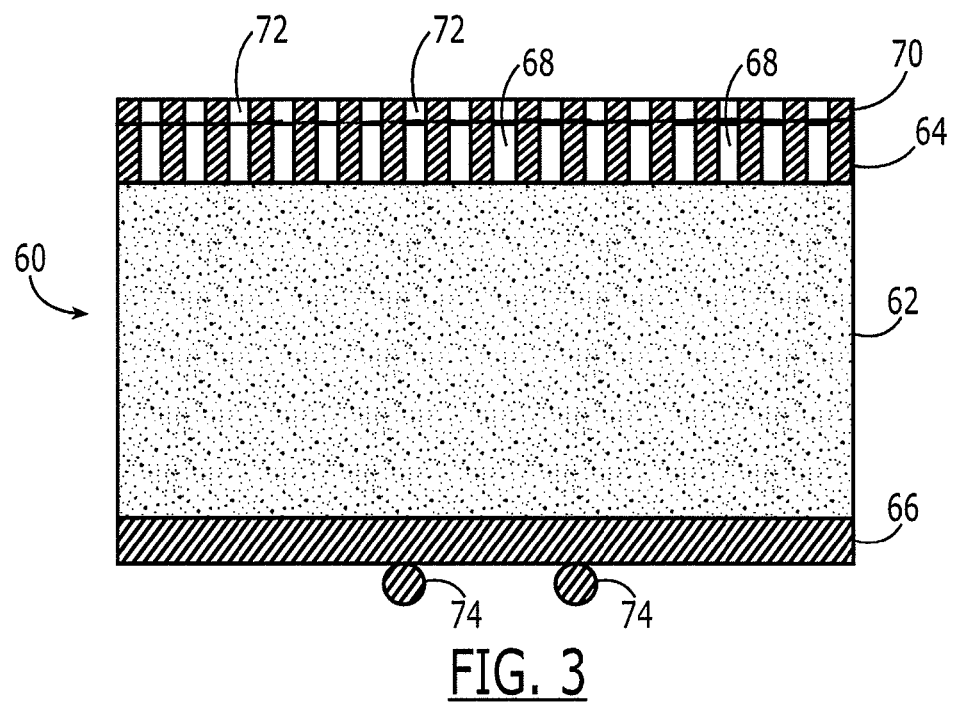
Figure 4:
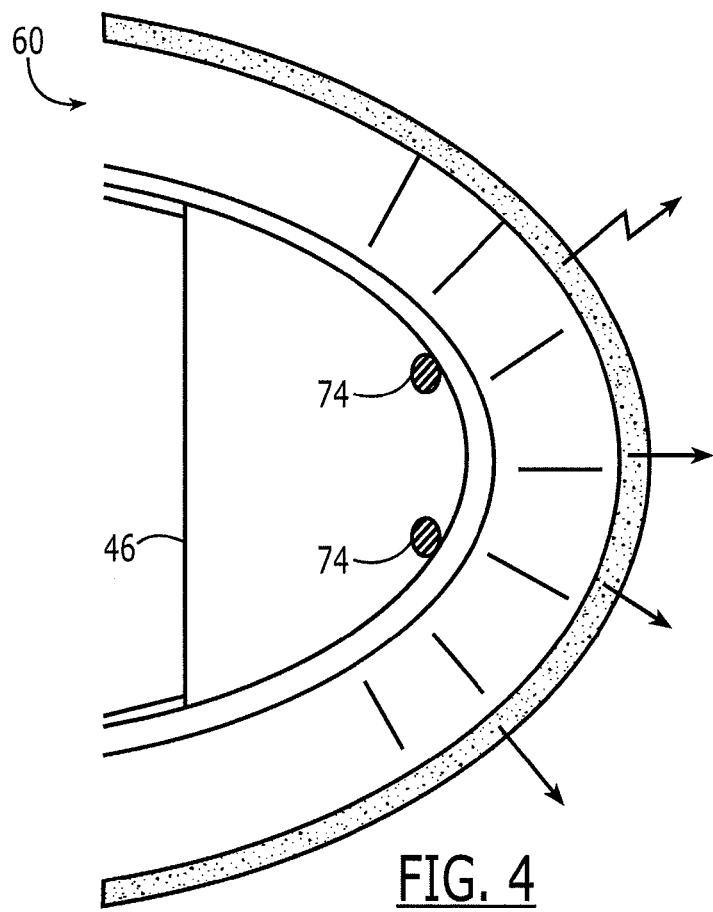
Figure 5:
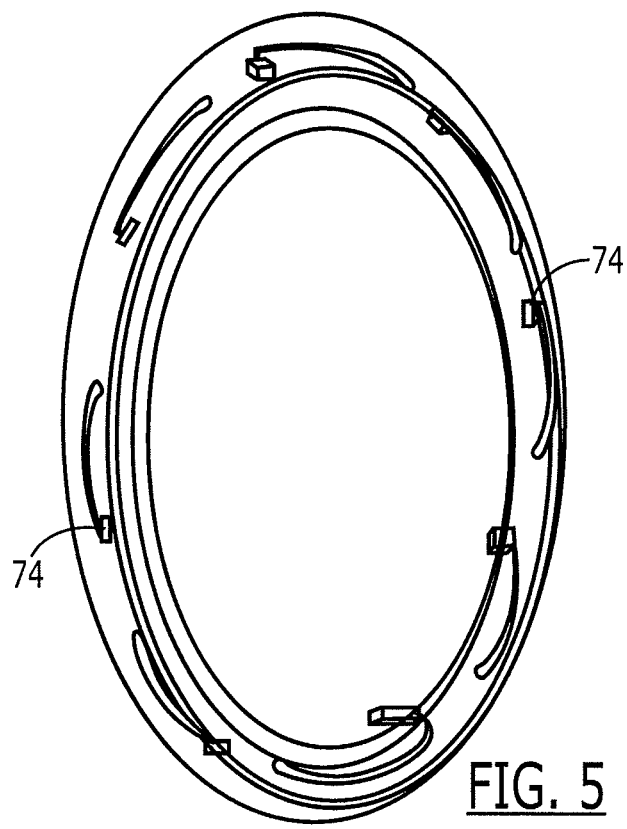
Figure 6:
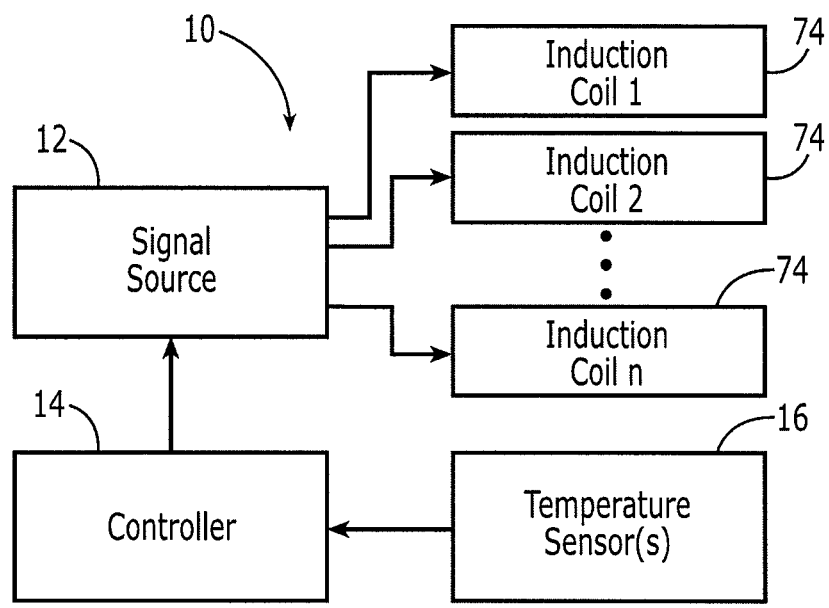
Figure 7:
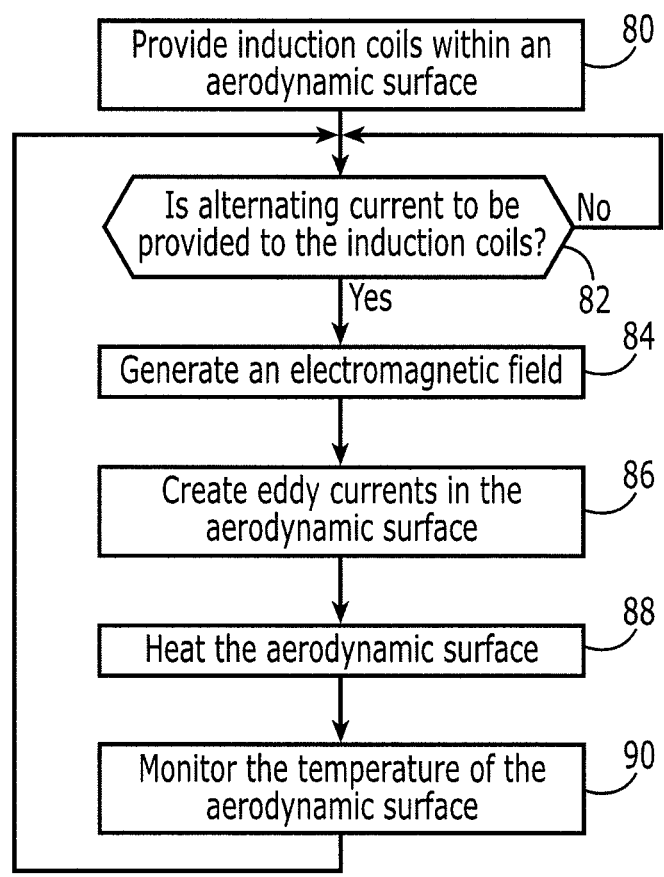

Having thus described the disclosure in general terms, reference will now be made to the accompanying drawings, which are not necessarily drawn to scale, and wherein:

FIG. 1 is a schematic side elevational view of an aircraft turbine engine mounted in a nacelle and incorporating an ice protection system in accordance with one embodiment of the present disclosure;

FIG. 2 is a partial cross-sectional side elevational view of that portion of the nacelle circled in FIG. 1;

FIG. 3 is a cross-sectional view of a portion of the nacelle of FIGS. 1 and 2 which illustrates the induction coils in accordance with one embodiment of the present disclosure;

FIG. 4 is a schematic cross-sectional view of a portion of a nacelle illustrating the heating of the exterior surface by a pair of induction coils in accordance with one embodiment of the present disclosure;

FIG. 5 is a schematic representation of a portion of an engine nacelle inlet having a plurality of induction coils spaced circumferentially thereabout in accordance with one embodiment of the present disclosure;

FIG. 6 is a block diagram of an ice protection system in accordance with one embodiment of the present disclosure; and FIG. 7 is a flow chart illustrating operations performed in accordance with a method of one embodiment of the present disclosure.

DETAILED DESCRIPTION

The present disclosure now will be described more fully hereinafter with reference to the accompanying drawings, in which some, but not all embodiments are shown. Indeed, the disclosure may be embodied in many different forms and should not be construed as limited to the embodiments set forth herein; rather, these embodiments are provided so that this disclosure will satisfy applicable legal requirements. Like numbers refer to like elements throughout.

As described below, an ice protection system 10 and method are provided for preventing or reducing the formation of ice upon an aerodynamic surface. Although primarily described below in conjunction with the prevention or reduction of ice formation upon an engine nacelle inlet, the ice protection system and method may be employed in conjunction with a variety of other aerodynamic surfaces, such as the leading edge of an aircraft wing, the leading edge of a flap, the leading edge of a blade, such as a blade of a wind turbine, or the like. By way of example of the application of the ice protection and system of one embodiment, however, an engine nacelle inlet is described below in conjunction with FIGS. 1-3. Although the nacelle inlet is described in conjunction with an aircraft turbine engine, the engine nacelle inlet that is protected by the ice protection system and method of embodiments of the present disclosure may be advantageously employed in conjunction with other types of engines, including electric engines, for example.

Referring now to FIG. 1, a partially schematic, side elevational view of an aircraft turbine engine assembly 20 is provided. The aircraft turbine engine assembly includes a turbine engine 22 housed in a nacelle 24 secured to a wing 26 by a strut 28. The nacelle includes an inlet 30 that supplies air to the turbine engine and a tail pipe 32 that directs exhaust products away from the engine.

In this embodiment, the engine 22 includes a low-pressure compressor 34 and a high-pressure compressor 36 mounted on concentric spools. The compressors pressurize the air provided by the inlet 30 and direct the pressurized air to a combustor 38. In the combustor, the pressurized air is mixed with fuel and burned. The hot exhaust products pass through a high-pressure turbine 40 (which drives the high-pressure compressor) and through a low-pressure turbine 42 (which drives the low-pressure compressor and a fan 44) before exiting through the tail pipe 32.

The inlet 30 may be configured to have a relatively low external and internal drag. Accordingly, the inlet can include a smoothly contoured external surface 46, a smoothly contoured internal surface 48 and a lip surface 50 extending between the external and internal surfaces. The lip surface defines the leading edge or hilite 52 at its forward-most point, and either the lip surface or the internal surface define a minimum inlet flow area or throat T of the hilite. During some flight conditions, water droplets may impinge on the inlet in the region that extends generally from the hilite 53 internally to the throat T and external along the external surface. Thus, the ice protection system and method of one embodiment is configured to prevent the water droplets from forming into ice or, if ice should form, to reduce the ice formation, either by reducing the thickness of the ice formation or reducing the rate at which the ice is formed.

Further details regarding the engine nacelle inlet lip surface are depicted in FIGS. 2 and 3. In this regard, FIG. 2 depicts the circled portion of the nacelle inlet lip surface of FIG. 1 which includes, in the illustrated example, that portion of the engine nacelle forward of the bulkhead 53. As also shown, the engine nacelle inlet lip surface of this embodiment includes an outer lip 54 which is defined to be that portion of the external surface 48 between the hilite and the bulkhead and an inner lip 56 which is defined to be that portion of the internal surface 48 between the hilite and the bulkhead. Additionally, the engine nacelle inlet lip surface of the illustrated embodiment defines a duct 58 therewithin.

The engine nacelle inlet lip surface of one embodiment includes an acoustic liner 60 as shown, for example, in FIG. 2 and more particularly, in FIG. 3. As shown, the acoustic liner may include a honeycomb core 62 positioned between a face sheet 64 and a back sheet 66. The face sheet and the back sheet may be formed of various materials including a metallic material, such as aluminum, titanium or a laminated composite material such as a carbon or glass reinforced plastic material. The honeycomb core generally includes a plurality of honeycomb cells. In some embodiments, the core may also include one or more septums extending through the plurality of honeycomb cells. The honeycomb core, including the cells and any septum(s), may also be formed of various materials including a metallic material, such as aluminum, titanium, metal matrix or a composite material such as a NOMAX® material available from E.I. DuPont de Nemours & Company. The face sheet may define a plurality of perforations that open into and are in fluid communication with respective honeycomb cells. As such, air flowing to or through the fan 44 may enter the core through the perforations, thereby reducing engine noise. The acoustic liner of one embedment may also include an erosion barrier 70 positioned upon and exterior to the face sheet. The erosion barrier may be formed of a metallic material, such as aluminum, titanium, metal matrix or a perforated metal, and may also define a plurality of perforations 72. As shown, for example, in FIG. 3, the perforations defined by the erosion barrier may be aligned with and generally coextensive with the perforations defined by the face sheet in order to facilitate fluid communication with the cells of the honeycomb core.

As a result of the substantial volume of air space within the honeycomb core 62, the acoustic liner 60 generally has relatively low thermal and electrical conductivity from its interior surface proximate the back sheet 66 to its exterior surface proximate the erosion barrier 70. Additionally, in embodiments in which the face sheet 64 and/or the back sheet are formed of composite materials, the thermal and/or electrical conductivity of these sheets may also be relatively low and may further reduce the thermal and/or electrical conductivity of the acoustic liner.

The ice protection system 10 of one embodiment includes an induction heating coil 74 and, more typically, a plurality of induction heating coils. The induction heating coils are generally provided within an aerodynamic surface, as shown in operation 80 of FIG. 7. For example, the induction heating coils may be positioned proximate to, but interior of the acoustic liner 60. As shown in FIGS. 3 and 4, for example, the induction coils may be positioned adjacent to, but interior of the face sheet 64. As such, the induction coils are spaced apart from the exterior surface that may be subject to ice accumulation. In regards to the embodiment of FIGS. 3 and 4, the inductions coils may be spaced apart from the exterior surface by the acoustic liner including the face sheet, the back sheet 66 and the honeycomb core 62 disposed there between. The induction coils are configured, however, such that by passing alternating current through the induction coils, an electromagnetic field is generated having a frequency, for example, of 5 to 20 kHz. See operations 82 and 84 of FIG. 7. In order to preferentially direct the electromagnetic field, the induction coils may have a predefined shape, such as a pancake shape, a hairpin shape, a paperclip shape or the like. In addition or alternatively, the induction coils may be disposed within a faraday cage and/or appropriately grounded. The electromagnetic field, in turn, creates an eddy current in an electrically conductive layer that lies within the electromagnetic field. See operation 86. In this regard, the erosion barrier 70 constitutes an electrically conductive layer that is disposed within the electromagnetic field generated by the induction coils such that an eddy current is created within the erosion barrier. The circulating eddy current, in turn, experiences electrical resistance within the electrically conductive layer, e.g., the erosion barrier, which generates heat, as indicated by the lines emanating outward from the acoustic liner of FIG. 4 and as shown in operation 88 of FIG. 7. The heat generated by the electrically conductive layer serves to prevent the formation of ice and/or reduces the formation of ice upon the engine nacelle inlet or other aerodynamic surface.

The plurality of induction coils 74 may be located at a number of positions selected to correspond to different portions of the exterior surface that is to be heated. While the ice protection system 10 may be configured so as to heat one portion of the exterior surface of an engine nacelle inlet or other aerodynamic surface, the ice protection system generally includes a plurality of induction coils positioned so as to provide relatively even heating to the exterior surface of the engine nacelle inlet or the like. The number of induction coils and their respective shapes, sizes and positions generally depend upon the desired penetration depth which, in turn, may be dependent upon the inlet geometry, the inlet mass flow and the material forming the inlet. The number of induction coils and their respective shapes, sizes and positions may be determined in various manners including icing tunnel testing at various simulated flight conditions. As shown in FIG. 4, for example, induction coils may be positioned relative to an engine nacelle inlet such that one induction coil serves to heat the outer lip 54 and the second induction coil serves to heat the inner lip 56. Although the embodiment of FIG. 4 depicts a single induction coil proximate the outer lip and a single induction coil proximate the inner lip, the ice protection system of other embodiments may include multiple induction coils proximate different portions of the outer lip and/or multiple induction coils proximate different portions of the inner lip with induction coils positioned at different distances from the hilite 52.

As the engine nacelle inlet is an annular structure, the ice protection system 10 may also include a plurality of induction coils 74 positioned at different circumferential locations about the engine nacelle inlet as shown in FIG. 5. In this regard, the ice protection system may include a first plurality of induction coils circumferentially positioned about the engine nacelle inlet so as to heat the outer lip 54, and a second plurality of induction coils circumferentially spaced about the engine nacelle inlet so as to heat the inner lip 56. Relative to FIG. 5, however, only one of the first and second pluralities of induction coils is depicted for purposes of illustration.

As illustrated in conjunction with FIGS. 3-5, the induction coils are therefore generally not only spaced from the exterior surface of the aerodynamic surface to be heated, but are also generally spaced apart from other induction coils so as to principally heat different corresponding portions of the exterior surface. Indeed, as represented by the looping path extending from each induction coil in FIG. 5, the eddy currents generated by actuation of the induction coils generally propagate through a portion of the electrically conductive layer that is most proximate to the respective induction coil such that actuation of an induction coil generally heats a corresponding portion of the electrically conductive layer.

As illustrated in FIG. 6, the ice protection system 10 may include a signal source 12 configured to provide alternating current, such as alternating radio frequency current, to the induction coils 74. Although the signal source may be configured in various manners, the signal source of one embodiment is an electrical signal source configured to generate alternating signals having any desired shape and frequency including, for example, radio frequency signals having square, sinusoidal or triangular waves. The signal source of one embodiment may be a variable frequency power supply. The electromagnetic field generated by an induction coil generally provides the most effective heating at a particular penetration depth or spacing from the induction coil. With respect to the ice protection system and method, it is generally desirable for the most effective heating to occur at the electrically conductive layer proximate the exterior surface of the aerodynamic surface, such as the erosion barrier 70. As such, the signal source of one embodiment is configured to provide alternating current at a frequency that is selected based upon the spacing between the induction coil and the electrically conductive layer and/or the power to be delivered per unit area and the penetration depth that are desired, thereby facilitating the efficient heating of the electrically conductive layer. In some embodiments, the ice protection system may include induction coils that have different configurations, such as different operating frequencies and/or different capacitances, in order to appropriately thermally excite the respective areas heated with each induction coil, thereby potentially conserving power and/or reducing the overall weight of the ice protection system.

The signal source 12 may be configured to concurrently provide alternating current to each of the induction coils 74 such that each of the induction coils is energized at the same time. Alternatively, the signal source may be configured to provide alternating current to one or more of the induction coils, but not to others of the induction coils during a first time period. During a later time period, the signal source may then provide alternating current to a different subset of the induction coils such that the induction coils are alternately activated in a scheduled or other controllable fashion.

In this regard, the ice protection system 10 may include a controller 14 configured to direct the operations of the signal source 12. In this regard, the controller may provide instructions regarding which inductions coils to be activated during each time period. In one embodiment, the controller may also provide instructions to the signal source regarding the magnitude and/or frequency of the alternating current to be provided to the induction coils 74. The controller may operate in accordance to the predefined schedule that defines the induction coils to be activated and, of those to be activated, the manner in which each induction coil is to be driven during each of a plurality of time periods. For example, it may be known that certain portions of the aerodynamic surface have a much greater likelihood of ice formation than other portions such that the controller may direct the signal source to more frequently activate the induction coils corresponding to that portion of the aerodynamic surface that is more likely to experience ice formation and to less frequently activate the induction coils corresponding to that portion of the aerodynamic surface that is less likely to experience ice formation. As such, the power consumed by the ice protection system may be judiciously managed with the power supply required for operation of the ice protection system potentially being reduced in size and weight relative to conventional ice protection systems.

In one embodiment, the ice protection system 10 also includes one or more temperature sensors 16 for monitoring the temperature of respective portions of the exterior surface. See operation 90 of FIG. 7. The temperature sensors may provide data to the controller 14 representative of the temperature of other respective portions of the exterior surface. The controller, in turn, may be configured to direct the signal source 12 to activate selected ones of the induction coils 74 based upon the temperature of those portions of the exterior surface corresponding to the different induction coils. See operation 82. In this regard, a portion of the exterior surface and an induction coil may correspond in instances in which a portion of the exterior surface is heated in response to activation of a respective induction coil. In one embodiment, a predefined threshold may be defined with temperatures below the predefined threshold triggering activation of the corresponding induction coils and temperatures above the threshold triggering deactivation of the corresponding induction coils. The threshold may be defined at different levels, but in one embodiment is set to be 35° F.

In one embodiment which includes a plurality of induction coils 74 and a corresponding plurality of temperature sensors 16, the controller 14 includes or is configured to access from an associated memory device a listing that associates each temperature sensor with one or more corresponding induction coils that are positioned so as to heat the portion of the exterior surface with which the respective temperature sensor is associated. In operation, the controller can therefore receive temperature data from the plurality of temperature sensors. In this regard, the temperature sensor can provide data along with an identification of the respective temperature sensor such that the controller can determine not only the sensed temperature, but also the temperature sensor that provided the data. The controller may then determine which of the temperature sensors provided data indicating that the temperature of the corresponding portion of the exterior surface is less than the threshold and may, in turn, direct the signal source to activate the induction coils associated with the temperature sensors that reported temperatures less than the threshold. The controller can also determine the temperature sensors that provided data indicative of temperatures greater than the threshold and may, in turn, direct the signal source to deactivate the induction coils corresponding to those temperature sensors that reported temperatures greater than the threshold. As such, the ice protection system of the embodiment may not only affect the prevention or reduction of ice formation, but may do so in an efficient manner by only activating an induction coil and therefore drawing current in instances in which the controller determines such activation to be necessary to prevent or reduce ice formation.

By selectively activating the induction coils 74, the power requirements may be reduced, thereby potentially permitting a smaller, lighter and less expensive power supply to be employed. Additionally, the ice protection system 10 may be lighter than some conventional systems by utilizing induction coils which can heat different regions of an aerodynamic surface. Further, the ice protection system and method are not dependent upon bleed air and is therefore widely applicable including, for example, with electric aircraft.

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An ice protection system comprising:
   an engine nacelle inlet having an electrically conductive layer comprising a metallic erosion barrier proximate an exterior surface and an acoustic liner comprising a composite facesheet, a honeycomb core and a composite backsheet positioned interior of the electrically conductive layer, wherein the composite facesheet defines a plurality of perforations and the metallic erosion barrier defines a plurality of perforations aligned and coextensive with respective perforations of the composite facesheet;
   at least one induction coil spaced apart from the electrically conductive layer and disposed interior of the acoustic liner so as to be spaced apart from the exterior surface by the acoustic liner; and
   a signal source configured to provide alternating current to the at least one induction coil to thereby generate an electromagnetic field that creates an eddy current in the electrically conductive layer so as to heat the electrically conductive layer.

2. An ice protection system in accordance with claim 1 wherein the at least one induction coil comprises a plurality of induction coils, wherein a respective induction coil is also spaced apart from other induction coils such that the respective induction coils are associated with different portions of the engine nacelle inlet.

3. An ice protection system in accordance with claim 1 further comprising a temperature sensor configured to monitor a temperature of the electrically conductive layer, and a controller configured to control provision of the alternating current by the signal source to the at least one induction coil based upon the temperature of the electrically conductive layer as monitored by the temperature sensor.

4. An ice protection system in accordance with claim 1 wherein the acoustic liner is formed of a less conductive material than the electrically conductive layer.

5. An ice protection system in accordance with claim 4 wherein the less conductive material of the acoustic liner is less conductive both thermally and electrically than the electrically conductive layer.

6. An ice protection system in accordance with claim 1 wherein the at least one induction coil comprises first and second pluralities of induction coils circumferentially positioned about the engine nacelle inlet to heat outer and inner lips of the engine nacelle inlet.

7. An ice protection system in accordance with claim 1 wherein the at least one induction coil has a pancake shape, a hairpin shape or a paperclip shape.

8. An ice protection system comprising:
   a plurality of induction coils spaced apart from an electrically conductive layer comprising a metallic erosion barrier proximate an exterior surface of an engine nacelle inlet by an acoustic liner comprising a composite facesheet, a honeycomb core and a composite backsheet positioned interior of the electrically conductive layer, wherein the composite facesheet defines a plurality of perforations and the metallic erosion barrier defines a plurality of perforations aligned and coextensive with respective perforations of the composite facesheet, wherein a respective induction coil is disposed interior of the acoustic liner, and wherein a respective induction coil is also spaced apart from other induction coils such that the respective induction coils are associated with different portions of the engine nacelle inlet; and
   a signal source configured to provide alternating current to the plurality of induction coils such that the induction coils responsively generate an electromagnetic field that creates an eddy current in the electrically conductive layer so as to heat the electrically conductive layer.

9. An ice protection system in accordance with claim 8 wherein the signal source is configured to provide alternating radio frequency current to the plurality of induction coils.

10. An ice protection system in accordance with claim 8 wherein the signal source is configured to concurrently provide alternating current to each induction coil.

11. An ice protection system in accordance with claim 8 wherein the signal source is configured to provide alternating current to respective induction coils during different time periods.

12. An ice protection system in accordance with claim 8 wherein the signal source is configured to provide alternating current having a frequency that is based on a spacing between the induction coils and the electrically conductive layer.

13. An ice protection system in accordance with claim 8 further comprising a temperature sensor configured to monitor a temperature of the electrically conductive layer, and a controller configured to control provision of the alternating current by the signal source to the plurality of induction coils based upon the temperature of the electrically conductive layer as monitored by the temperature sensor.

14. An ice protection system in accordance with claim 8 wherein at least one of the plurality of induction coils has a pancake shape, a hairpin shape or a paperclip shape.

15. An ice protection method comprising:
providing a plurality of induction coils spaced apart from an electrically conductive layer comprising a metallic erosion barrier proximate an exterior surface of an engine nacelle inlet by an acoustic liner comprising a composite facesheet, a honeycomb core and a composite backsheet positioned interior of the electrically conductive layer, wherein the composite facesheet defines a plurality of perforations and the metallic erosion barrier defines a plurality of perforations aligned and coextensive with respective perforations of the composite facesheet, wherein a respective induction coil is disposed interior of the acoustic liner, and wherein a respective induction coil is also spaced apart from other induction coils such that the respective induction coils are associated with different portions of the engine nacelle inlet;
providing alternating current to the plurality of induction coils; and
generating an electromagnetic field in response to the alternating current that creates an eddy current in the electrically conductive layer so as to heat the electrically conductive layer.

16. An ice protection method in accordance with claim 15 wherein providing alternating current comprises providing alternating radio frequency current to the plurality of induction coils.

17. An ice protection method in accordance with claim 15 wherein providing the alternating current comprises concurrently providing alternating current to each induction coil.

18. An ice protection method in accordance with claim 15 wherein providing the alternating current comprises providing alternating current to respective induction coils during different time periods.

19. An ice protection method in accordance with claim 15 wherein providing alternating current comprises providing alternating current having a frequency that is based on a spacing between the induction coils and the electrically conductive layer.

20. An ice protection method in accordance with claim 15 further comprising monitoring a temperature of the electrically conductive layer, and controlling provision of the alternating current to the plurality of induction coils based upon the temperature of the electrically conductive layer as monitored.

* * * * *